Figure 1:
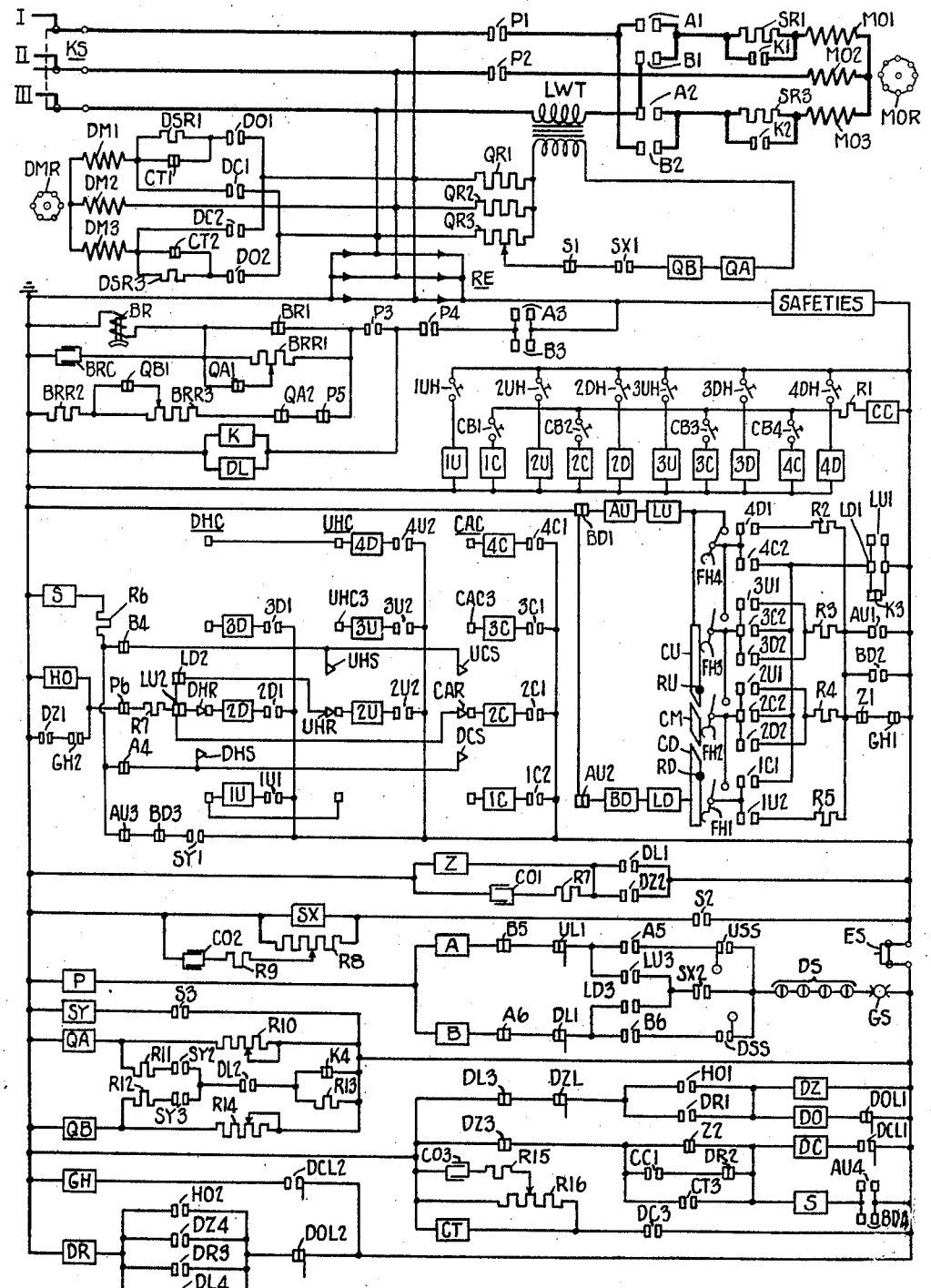

May 2, 1944.　　　　J. D. LEWIS　　　　2,347,917

LOAD DETERMINING APPARATUS

Filed Nov. 2, 1942　　　2 Sheets-Sheet 1

Jacob Daniel Lewis　INVENTOR

BY Walter T. S. Bradley　ATTORNEY

May 2, 1944.    J. D. LEWIS    2,347,917
LOAD DETERMINING APPARATUS
Filed Nov. 2, 1942    2 Sheets-Sheet 2

Jacob Daniel Lewis    INVENTOR
BY Walter E. O. Bradley    ATTORNEY

Patented May 2, 1944

2,347,917

UNITED STATES PATENT OFFICE 2,347,917

LOAD DETERMINING APPARATUS

Jacob Daniel Lewis, Yonkers, N. Y., assignor to Otis Elevator Company, New York, N. Y., a corporation of New Jersey Application November 2, 1942, Serial No. 464,298

11 Claims. (Cl. 172—152)

The invention relates to apparatus for determining the load on alternating current motors, especially alternating current hoisting motors for elevators.

In buildings which are provided with polyphase alternating current power supply, there are certain advantages in utilizing polyphase alternating current hoisting motors for the elevators, especially for the slow speed installations. In both single speed and multi speed installations in which such motors are utilized, the accuracy of the stop and the time consumed in making the stop are affected by load, which is especially disadvantageous where the stopping is automatic. Various arrangements have been employed for determining the load on an elevator hoisting motor and for utilizing such determination in controlling the stopping of the elevator car to obtain accurate stops at the landings. In some instances a constant retarding force is applied and the distance from the landing at which the stop is initiated is varied in accordance with the load determination obtained. In other instances the stop is initiated at a fixed distance from the landing and the retarding force applied is varied in accordance with the load determination obtained. Still other arrangements may be utilized.

The object of the invention is to provide simple and inexpensive apparatus for making a utilizable electrical determination of the load on an alternating current motor.

The invention involves determining the load on an alternating current motor by the phase relationship of the current supplied to the motor to the voltage impressed on the motor.

In one embodiment of the invention as applied to a polyphase alternating current installation a single phase current transformer is provided having its primary winding in series with one phase of the supply lines. Electroresponsive means is connected to be subject to the vector sum of the voltage induced in the transformer secondary and a voltage the phase of which is determined by the voltage applied to the motor.

The invention is especially applicable to elevator installations employing single speed polyphase alternating current hoisting motors. In such an installation it is usual to slow down and stop the car simply by discontinuing the supply of current to the hoisting motor and applying the electromechanical brake. There are certain advantages in installations in which automatic stopping is provided in having a fixed stopping distance for the elevator car and varying the retarding force applied to bring the car to a stop in accordance with load conditions. The invention will be described as applied to such an arrangement, in which the electroresponsive means is utilized to control the retarding force in stopping the car so as to compensate for load.

A general idea of the invention, the mode of carrying it out which is at present preferred, and various features and advantages thereof will be gained from the above statements. Other features and advantages of the invention will be apparent from the following description and appended claims.

Figure 1S:
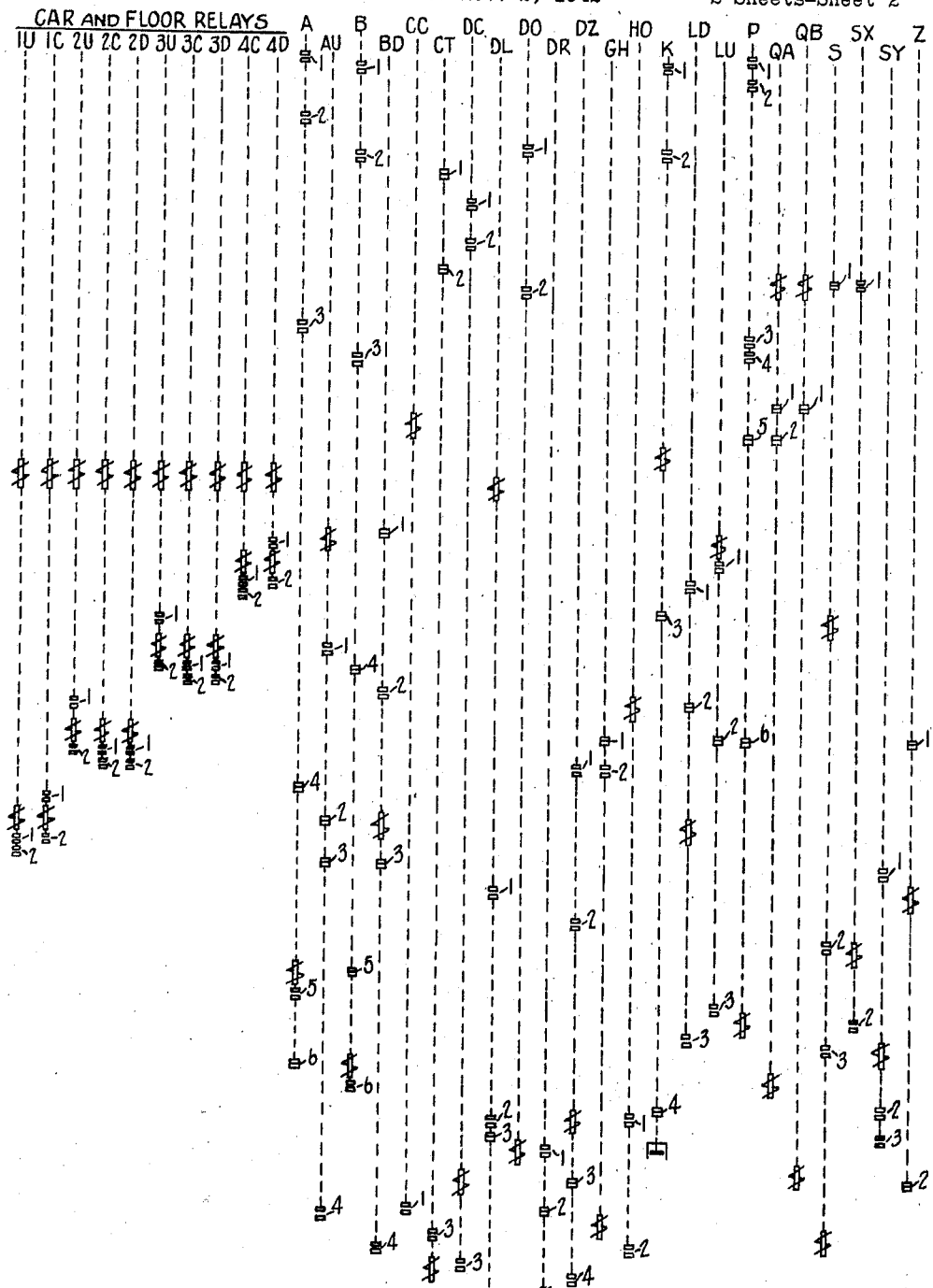

In the drawings:

Figure 1 is a simplified wiring diagram in "across-the-line" form of an elevator control system chosen to illustrate the principles of the invention; and Figure 1s is a key sheet for Figure 1 showing the electromagnetic switches in spindle form with the contacts and coils arranged on the spindles in horizontal alignment with the corresponding contacts and coils in the wiring diagram.

For illustrating the principles of the invention a system of elevator control has been illustrated in which the slow down and stopping of the car at the various floors is automatic. There are various types of elevator control of this character, the type illustrated being known as collective push button control. A collective push button control system such as shown in the patent to Dunn, Number 2,032,475, granted March 3, 1936, has been illustrated. In the system of the Dunn patent, the pressing of a push button either in the car or at a landing starts the car in a direction toward the floor for which the push button is provided. The car is slowed down and stopped at landings for which push buttons have been pressed, the car being automatically restarted after each stop so long as push buttons remain to be responded to.

Push button control circuits for only four floors are illustrated. A push button is provided in the car for each of the floors. Also, a push button is provided at the first and fourth floors and an up push button and a down push button are provided both at the second and at the third floors. The push buttons in the car are designated in accordance with their location and the floor for which they are provided. For example, CB3 designates the third floor car button. Push buttons at the landings are designated in accordance with the floor and their direction. For example, 2UH designates the up second floor hall button.

The push buttons act through floor relays to control the operation of the car. The floor relays are designated similarly to their controlling push buttons, the car button floor relays being designated C and the hall button floor relays being designated U or D depending upon whether they are provided for up push buttons or down push buttons. The floor relays, when operated, remain in operated condition, thereby permitting the push buttons to be released. When the call is answered, the floor relay is reset. Various forms of such floor relays may be utilized.

The floor relays are arranged to act through direction mechanism on a floor controller to control the direction of travel of the elevator car. This floor controller is also utilized in the form of control illustrated to control the stopping of the car. A floor controller, of the form disclosed in the patent to Waters et al., Number 2,100,176, granted November 23, 1937, may be utilized, the particular parts of such floor controller employed in the system illustrated having been diagrammatically indicated in the wiring diagram. The direction mechanism comprises a plurality of stationary direction switches, one for each floor, designated FH1, FH2, FH3 and FH4 for the first, second, third and fourth floors respectively, and a direction cam of three sections designated CU, CM and CD carried by the crosshead. Insulating rollers for lifting the direction switches off the cams are designated RU and RD. The stationary contacts of the floor controller controlled by the car buttons, up hall buttons and down hall buttons are designated CAC, UHC and DHC respectively. The brushes for engaging these contacts to pick up calls are designated UCS and DCS for contacts CAC, UHS for contacts UHC, and DHS for contacts DHC. The reset brushes are designated CAR, UHR and DHR for contacts CAC, UHC and DHC respectively. These brushes are carried by the crosshead. An up stop switch USS and a down stop switch DSS are carried by the crosshead and are operated by stationary cams as the car arrives at the respective floors in the directions for which the stop switches are provided as explained in the Waters et al. patent.

The electromagnetic switches employed in the control system have been designated as follows:

A Up reversing switch
AU Up reversing switch relay
B Down reversing switch
BD Down reversing switch relay
CC Car button relay
CT Reverse resistance relay
DC Door close switch
DL Auxiliary door relay
DO Door open switch
DR Door relay
DZ Door re-open relay
GH Auxiliary door close relay
HO Hall re-open relay
K Accelerating switch
LD Down auxiliary reversing switch relay
LU Up auxiliary reversing switch relay
P Main line switch
QA First load switch
QB Second load switch
S Stopping relay
SX First auxiliary stopping relay
SY Second auxiliary stopping relay
Z Time relay Throughout the description which follows, these letters will be applied to the coils of the above designated switches. Also, with reference numerals appended thereto they will be applied to the contacts of these switches as for example A1.

The supply mains of the polyphase alternating current source of supply are designated I, II and III. KS is a triple-pole knife switch for connecting the system to the supply mains. A polyphase rectifier RE is utilized to provide direct current derived from the alternating current supply mains for operating the floor relays and certain of the electromagnetic switches. BR is the release coil of the electromechanical brake BRR1, BRR2 and BRR3 are resistances for controlling the energization of the brake release coil. BRC is a condenser connected across the brake release coil.

The hoisting motor is a polyphase alternating current squirrel cage induction motor. The stator windings of the motor are designated MO1, MO2 and MO3 while the rotor is designated MOR. SR1 and SR3 are resistances in circuit with the stator windings of the hoisting motor. The gate contacts are designated GS while the door contacts are designated DS. Both the car gate and the hatchway doors are operated by a motor carried by the elevator car, as for example as disclosed in the patent to Norton et al., Number 1,950,150, granted March 6, 1934. The door operating motor is a polyphase alternating current squirrel cage induction motor. The stator windings of this motor are designated DM1, DM2 and DM3 while the rotor is designated DMR. DSR1 and DSR3 designate resistances in circuit with the stator windings of the door operating motor.

An emergency stop switch ES is provided in the car. The contacts of the various safety devices are indicated by the legend "safeties." Terminal limit switches are designated UL1 and DL1. Limit switches operated by the door operating mechanism are designated DOL1, DCL1, DCL2 and DOL2. DZL is a door zone limit switch carried by the car and closed by cams in the hatchway, one at each floor. LWT designates the transformer utilized in determining the load on the elevator motor, while QR1, QR2 and QR3 are resistances employed in connecting the secondary winding of the transformer to the supply mains. Other resistances employed in the control system are designated R1, R2, R3, R4, R5, R6, R7, R8, R9, R10, R11, R12, R13, R14, R15 and R16. Other condensers utilized are designated CO1, CO2 and CO3. The electromagnetic switches are illustrated in deenergized position. Also, all latching switches are illustrated in reset condition.

Before describing the operation of the load determining apparatus and the control exercised thereby in stopping the car, operation of the car in response to the push buttons will be described. Assume that the car is idle at the second floor, the floor controller being illustrated in accordance with this assumption. As the car is idle, the first floor hatchway door and car gate are closed, thus door contacts DS and gate contacts GS are engaged.

Assume now that an intending passenger at the third floor pressed up third floor hall button 3UH. This completes the circuit for the operating coil of up third floor relay 3U. The third floor relay operates to engage contacts 3U1 and 3U2 which remain engaged after the push button is released. Contacts 3U1 complete a circuit for the coils of up reversing switch relay AU and up auxiliary reversing relay LU, this circuit being through contacts BD1, coils of relays AU and LU, up cam section CU, direction switch FH3, floor relay contacts 3U1, resistance R3, and contacts Z1 and GH1.

Up reversing switch relay AU, upon operation, engages contacts AU1 and AU4 and separates contacts AU2 and AU3. Up auxiliary reversing switch relay LU, upon operation, engages contacts LU1 and LU3 and separates contacts LU2. Contacts AU2 are interlock contacts for the coil of down reversing switch relay BD and down auxiliary reversing switch relay LD. Contacts LU2 separate to render reset brush DHR ineffective for up car travel. Contacts AU4 complete a circuit for the operating coil of stopping relay S, this circuit being through contacts DZ3 and Z2, operating coil of relay S, and contacts AU4.

Relay S, upon operation, separates contacts S1 and engages contacts S2 and S3. The engagement of contacts S2 completes a circuit for the coil of first auxiliary stopping relay SX while the engagement of contacts S3 completes a circuit for the coil of second auxiliary stopping relay SY. Relay SY, upon operation, engages contacts SY1, SY2 and SY3 while relay SX, upon operation, engages contacts SX1 and SX2. The separation of contacts S1 prevents the completion of the circuit of the secondary winding of the load determining transformer LWT when contacts SX1 engage. The engagement of contacts SX2 completes a circuit for the coils of up reversing switch A and main line switch P, this circuit being through these coils, contacts B5, up limit switch UL1, contacts LU3 and SX2, door contacts DS and gate contact GS.

Up reversing switch A, upon operation, engages contacts A1, A2, A3 and A5 and separates contacts A4 and A6. Main line switch P, upon operation, engages contacts P1, P2, P3 and P4 and separates contacts P5 and P6. Contacts A6 are interlock contacts for the coil of down reversing switch B. The separation of contacts A4 renders down brushes DHS and DCS ineffective for up car travel. Contacts A5 prepare a holding circuit for the coils of switches A and P. Contacts A1 and A2 prepare the circuits for the stator windings of the elevator hoisting motor for a phase rotation of applied voltage for up direction of car travel. Contacts P1 and P2 complete the circuit for the stator windings of the hoisting motor. At the same time contacts P3 and P4 and contacts A3 complete the circuit for the brake release coil BR. As a result the brake is released and the car is started in the up direction. Contacts P5 separate before the engagement of contacts P3 and P4 and disconnect resistances BRR2 and BRR3 from across the brake release coil.

The engagement of contacts P4 and contacts A3 also completes a circuit for the coils of accelerating switch K and auxiliary door relay DL. Relay DL, upon operation, engages contacts DL1, DL2 and DL4 and separates contacts DL3. The engagement of contacts DL1 completes a circuit for the coil of time relay Z. Relay Z, upon operation, separates contacts Z1 and Z2. The separation of contacts Z1 is without effect as they are now by-passed by contacts AU1.

The separation of contacts Z2 breaks the circuit for the operating coil of stopping relay S. This relay is of the same type as the floor relays, remaining in operated condition when the circuit for its operating coil is broken. The engagement of contacts DL4 completes a circuit for the coil of door relay DR. This relay, upon operation, engages contacts DR1 and DR3 and separates contacts DR2. Contacts DR3 establish a self-holding circuit for the coil of relay DR. Contacts DL3 separate before contacts DR1 engage thereby preventing the energization of the coils of switches DO and DZ. The engagement of contacts DL2 completes the circuit for the operating coils of the first load switch QA and the second load switch QB. The circuit for the coil of switch QA being through resistance R11, contacts SY2, DL2 and K4 and the circuit for the coil of switch QB being through resistance R12, contacts SY3, DL2 and K4. This causes the operation of the load switches to separate QA1, QA2 and QB1. While the operating coils of these switches have been connected across the supply lines prior to this time through resistances R10 and R14, these resistances are of high value, preventing the operation of these switches. The purpose of these load switches will be explained later.

Switch K does not operate immediately the circuit for its operating coil is completed being delayed as by a dash pot. Upon operation it engages contacts K1 and K2 and separates contacts K3 and K4. The separation of contacts K4 inserts cooling resistance R13 in circuit with the operating coils of the load switches. The engagement of contacts K1 and K2 short circuit resistances SR1 and SR3 in circuit with the stator windings of the hoisting motor to increase the torque for full speed operation. As the car leaves the first floor up stop switch USS closes completing the holding circuit for the coils of switches A and P.

As the car nears the third floor up brushes UCS and UHS engage stationary contacts CAC3 and UHC3 respectively. As the up third floor relay is operated, the engagement of brush UHS with contacts UHC3 completes a circuit for the reset coil of stopping relay S through resistance R6, contacts B4, brush UHS, contacts UHC3, reset coil 3U, the up third floor relay and contacts 3U2. The voltage applied to the reset coil of the floor relay is not sufficient to reset this relay. This voltage, however, is sufficient to cause the resetting of the stopping relay. At the same time up roller RU moves into engagement with the third floor direction switch FH3 to break the circuits for the coils of direction relays AU and LU causing these relays to drop out. As a result contacts LU3 separate to break the initial energizing circuit for the coils of up direction switch A and main line switch P. These coils are maintained energized, however, through contacts A5 and up stop switch USS. As the car arrives at a certain distance from the third floor up stop switch USS is opened to break the circuits for the coils of switches A and P with the result that the circuit for the stator windings of the elevator hoisting motor are broken and the brake release coil BR is deenergized and the brake applied to bring the car to a stop at the third floor.

The separation of contacts A3 and P4 as the car is brought to a stop breaks the circuit for the coils of accelerating switch K and auxiliary door relay DL. Auxiliary door relay DL upon dropping out separates contacts DL1, DL2 and DL4 and engages contacts DL3. The engagement of contacts DL3 completes a circuit through door zone limit switch DZL now closed and contacts DR1 for the coils of door open switch DO and door re-open relay DZ. The door open switch DO engages contacts DO1 and DO2 to energize the stator windings of the door operating motor to open the door and gate. The door re-open relay DZ engages contacts DZ2 to by-pass contacts DL1 to maintain the coil of time relay Z energized. As the door and gate start to open, limit switch DCL2 closes to complete the circuit for the coil of auxiliary door close relay GH. Relay GH engages contacts GH2 which, together with the engagement of contacts DZ1, complete a by-pass circuit for the coil of hall re-open relay HO. Thus, with contacts P6 engaged and brush UHR in engagement with the third floor stationary contact UHC3, a circuit is completed which causes the application of sufficient voltage to be applied to the reset coil of the up third floor relay to cause this relay to be reset.

As the door and gate reach open position limit switches DOL1 and DOL2 open. The opening of limit switch DOL1 breaks the circuit for the coil of door open switch DO and the opening of limit switch DOL2 breaks the circuit for door relay DR, causing these switches to drop out. The dropping out of switch DO breaks the circuit for the door operating motor. The dropping out of relay DR breaks the circuit for the coil of door re-open relay DZ, causing this relay to drop out. The dropping out of relay DZ breaks the circuit for the coil of time relay Z. This relay is delayed in dropping out by the discharge of condenser CO1 to enable the passenger to enter the car. Under the conditions assumed it also provides time for the passenger to press a car button for his desired destination and thus determine the direction of car travel. When the time interval of this relay has expired, contacts Z1 reengage rendering the hall buttons effective to control direction and contacts Z2 engage to establish a circuit for the coil of door close switch DC. This switch engages contacts DC1 and DC2 to establish a circuit for the stator windings of the door operating motor to effected closing of the door and gate.

The car is started in the down direction in response to the pressing of a button for a floor below the car. It is not believed necessary to describe this operation as it is believed it will be understood from the above description of starting the car in the up direction. For starting the car in the down direction down reversing switch relay BD, down auxiliary reversing switch relay LD and down reversing switch B are operated instead of relays AU and LU and switch A.

The stopping relay S is reset for each stopping operation and prior to the actual initiation of the slow down. When a stop is to be made in response to a hall button for the opposite direction of car travel under conditions where there are no calls beyond, the circuit for the reset coil of the stopping relay is completed through contacts AU3, BD3 and SY1. The reset of the stopping relay ahead of the actual stopping is utilized in the system shown in determining the load in the elevator car. Each of the load switches QA and QB is provided with a load responsive coil and an operating coil. The operating coils are subject to direct current and are energized while the car is running. The load responsive coils are subject to alternating current and are connected so that their excitation is dependent both on the voltage of the secondary of the load determining transformer LWT and line voltage.

When stopping relay S drops out, it engages contacts S1 in the circuit for the load responsive coils of the load switches. At the same time it separates contacts S2 and S3 breaking the circuits for the coils of auxiliary stopping relays SX and SY. Relay SY drops out immediately, separating contacts SY2 and SY3 to render the operating coils of the load switches subject to regulatory resistances R10 and R14. Relay SX, however, is delayed slightly in dropping out by the discharge of condenser CO2 so that contacts SX1 remain in engagement to maintain the circuit for the load responsive coils of the load switches long enough for the load determination to be made. The load responsive coils of each switch, being subject to alternating current, opposes the operating coil during each half cycle and, depending upon the adjustment, causes the dropping out of the switch when the voltage applied to the coil is at or above a certain value. The switches are adjusted so that the first load switch QA is dropped out when the load on the motor is at or above a certain value and the second load switch QB is dropped out when the load on the motor is at or above another value greater than that at which the first load switch is dropped out. After the load determination has thus been made, contacts SX1 separate. The dropped out load switches can not reoperate at this time, however, owing to the high value of regulatory resistances R10 and R14. These regulatory resistances are adjusted to determine the points at which the respective load switches drop out.

The condition of the load switches at the time the stop switch USS or DSS opens to stop the car controls the action of the electromechanical brake in stopping the car. If the load is such that neither of the load switches drop out, as when the elevator motor is lowering full load, contacts QA1 and QA2 are separated so that there is only a certain energization of the brake release coil just before its circuit is broken and no discharge resistance is connected across the coil. Thus the brake is quickly applied to bring the car to a stop. If the load is such that the first load switch is dropped out, contacts QA1 and QA2 are engaged. Contacts QA1 short-circuit a portion of resistance BRR1, increasing the energization of the brake release coil. Contacts QA2 are in the circuit for discharge resistances BRR2 and BRR3 so that upon the opening of the stop switch to stop the car, the reengagement of contacts P5 connects this resistance across the brake release coil to cause the brake to be gradually applied. Should the load be such that both load switches are dropped out, contacts QB1 short-circuit a portion of resistance BRR3 so that the resistance of the brake discharge circuit is lower and the brake is more gradually applied.

The value of the voltage applied to the load responsive coils of the load switches is dependent both on the values and phase relationship of the secondary voltage of load determining transformer LWT and the line voltage. Although the value of the current supplied to polyphase alternating current induction elevator hoisting motors does not vary a great deal with changes in load, the phase of this current with respect to that of the applied voltage, i. e., the power factor, does vary considerably with load. Thus, in the arrangement illustrated, the phase of the voltage induced in the secondary of transformer LWT varies with load, and therefore the phase relationship of the components of the voltage applied to the load responsive coils varies with load. As the voltage applied to the load responsive coils is the vector sum of the transformer secondary voltage and a voltage the value and phase of which is determined by the voltage applied to the hoisting motor, the excitation of these coils is in accordance with the load on the motor. The line voltage component utilized is that of phase III to the star point of resistances QR1, QR2 and QR3. It is preferred to adjustably connect these coils to resistance QR3 so that by a potentiometer action the line component of the voltage impressed on the coils is made substantially equal to the transformer secondary component at no load on the motor which, in installations of the character described in which geared machines are utilized, occurs under conditions about where the car is empty and travelling up. Also the connections are such that these voltage components act in opposition at no load. As the voltage applied to the load responsive coils is the vector sum of the line voltage and transformer voltage components, and as the transformer secondary voltage component is in opposition to this line voltage component at no load and its angle of lag decreases as the load increases, the excitation of the load responsive coils increases with increasing load. Thus the opposition of the load responsive coils to the operating coils of the load switches increases as the load on the motor increases, causing these switches to drop out when the excitation of the load responsive coils reach certain values respectively, dependent on the adjustment of resistances R10 and R14. By proper adjustment, operation of the load switches to cause accurate stops of the car at the landings is effected regardless of load.

Two load switches give very satisfactory operation for certain installations such as those operating at 100 F. P. M., although the requirements for such installations may be satisfied with one load switch. The number of load switches employed therefore is dependent upon the character and requirements of the particular installation and while the invention is particularly applicable to slow speed installations, it is to be understood that it is also applicable to higher speed installations. It is also to be understood that various changes may be made in the particular arrangement shown and specifically described. For example, instead of controlling the rate of application of the brake, the time at which the brake is applied may be controlled as by controlling the deenergization of the brake by a time relay, the excitation of which is controlled by the load determining apparatus. Such a scheme could be used also in conjunction with a brake supplied with alternating current. The load determining apparatus may be employed to control other retarding arrangements for the hoisting motor in which a plurality of steps of adjustment of retardation may be utilized. Also, the load determining apparatus may be utilized to control the point at which slow down is initiated instead of having the slow down initiated at a fixed distance and varying the stopping force, or it may be utilized for other purposes than controlling the stopping of an elevator car. It is preferred to connect the load determining apparatus as illustrated, that is so that the voltage of the transformer secondary winding is combined with the voltage of the supply line in which the transformer primary is connected and so as to oppose this voltage at no load as this gives a large variation in the value of the resultant voltage. However, other arrangements may be employed, as for example an arrangement in which the transformer secondary winding voltage assists the line voltage. Also, the transformer secondary voltage may be combined with some other voltage of the supply lines to vary the resultant voltage in accordance with the load on the motor.

Although the invention has been described as applied to a three phase alternating current elevator installation, it is applicable to installations of other numbers of phases. Also it may be applied to installations in which the hoisting motor is delta connected in which event it is preferred to create an artificial neutral as with resistances QR1, QR2 and QR3 to enable the voltage of the secondary winding of the load determining transformer to be related to the voltage of the line in which the transformer primary is connected. Also, although a collective push button control system has been described, it is to be understood that the invention is applicable to other forms of push button control and to systems controlled in other ways such as those in which the starting of the car is under the control of an attendant in the car with slow down controlled by passengers and intending passengers themselves, those in which both starting and slow down are under the control of a car attendant, with the slow down initiated automatically after movement of the control switch in the car to a certain position, or those in which both starting and slow down are controlled directly by the car attendant.

Thus as many changes may be made without departing from the scope of the invention and as the invention has many applications, it is intended that all matter contained in the above description or shown in the accompanying drawings shall be interpreted as illustrative and not in a limiting sense.

What is claimed is:

1. Apparatus for determining the load imposed by a translating device on a source of alternating current comprising, a transformer having its primary winding excited in accordance with the current drawn by said device, and electroresponsive means subject to the vector sum of the voltage of the secondary of said transformer and a voltage the phase of which is determined by the voltage applied to the translating device.

2. Apparatus for determining the load on a polyphase alternating current motor supplied with power from a source of polyphase alternating current comprising, a transformer having its primary winding connected to be subject to the current supplied to said motor, and an electroresponsive device connected to be subject to the vector sum of the voltage induced in the secondary winding of said transformer and a voltage the phase of which is determined by the voltage applied to said motor.

3. Apparatus for determining the load on a polyphase alternating current motor supplied with power from a source of polyphase alternating current comprising, a single phase transformer having its primary winding connected to be subject to the current supplied to said motor from one phase of said source, and an electroresponsive device connected to be subject to the vector sum of the voltage induced in the secondary winding of said transformer and a voltage the phase of which is determined by the voltage of said one phase of said source.

4. Apparatus for determining the load on a polyphase alternating current motor supplied with power from a source of polyphase alternating current comprising, a single phase transformer having its primary winding connected to be subject to the current supplied to said motor from one phase of said source, and an electroresponsive device connected to be subject to a voltage of a value determined by the value and phase relationship of the voltage of the transformer secondary and the voltage of said one phase of said source.

5. Apparatus for determining the load on a polyphase alternating current motor supplied with power from a source of polyphase alternating current comprising, a single phase transformer having its primary winding connected in series relation in one of the supply lines of said source, an electroresponsive device, and a circuit including said electroresponsive device and the secondary winding of said transformer in series connected to said one supply line and to a star point.

6. Apparatus for determining the load on a polyphase alternating current motor supplied with power from a source of polyphase alternating current comprising, a single phase transformer having its primary winding connected in series relation in one of the supply lines of said source, an electroresponsive device, and a circuit including said electroresponsive device and the secondary winding of said transformer in series connected to said one supply line and to a star point with the polarity of the connection of the transformer secondary winding such that the components of the voltage applied to said electroresponsive device are in opposition.

7. Apparatus for determining the load on a polyphase alternating current motor supplied with power from a source of polyphase alternating current comprising, a single phase transformer having its primary winding connected in series relation in one of the supply lines of said source, an electroresponsive device, and a circuit including said electroresponsive device and the secondary winding of said transformer in series connected to said one supply line and to a star point with the polarity of the connection of the transformer secondary winding such that the components of the voltage applied to said electroresponsive device are in opposition, said circuit including means for causing said voltage components to be substantially equal at no load on the motor.

8. In an elevator installation in which an elevator car serving a plurality of landings is provided with a polyphase alternating current induction hoisting motor supplied with power from a source of polyphase alternating current, in which stopping means is provided for stopping the car at the landing and in which load determining apparatus is provided for controlling the operation of said stopping means to compensate for the load in the car in stopping the car at the landings, said apparatus comprising; a single phase transformer having its primary winding connected in one of the alternating current supply lines in series with said motor and one side of its secondary winding connected to said one supply line; electroresponsive means connected to the other side of said secondary winding and a star point for said source, said connections being such that the voltage of said secondary winding opposes the voltage from said supply line to said star point; and a potentiometer for causing the values of the voltages applied to said electroresponsive means from said transformer and said one supply line to be substantially equal at no load on the motor.

9. In an elevator installation in which an elevator car serving a plurality of landings is provided with a polyphase alternating current induction hoisting motor supplied with power from a source of polyphase alternating current, in which stopping means is provided for stopping the car at the landing and in which load determining apparatus is provided for controlling the operation of said stopping means to compensate for the load in the car in stopping the car at the landings, said apparatus comprising; a single phase transformer having its primary winding connected in one of the alternating current supply lines in series with said motor and one side of its secondary winding connected to said one supply line; a polyphase artificial neutral formed by resistances connected in star relationship across the supply lines of said source; and electroresponsive means connected to the other side of said secondary winding and said artificial neutral, the connection to said neutral being at a point on said resistance connected to said one supply line such that the component of the voltage applied to said electroresponsive means from said transformer secondary and that applied from said one supply line are substantially equal at no load as said motor and the polarity of the connection of said transformer secondary being such that the voltage of said secondary winding opposes said voltage applied from one supply line.

10. In an elevator installation in which an elevator car serving a plurality of landings is provided with a polyphase alternating current induction hoisting motor supplied with power from a source of polyphase alternating current, in which stopping means is provided for stopping the car at the landings and in which load determining apparatus is provided for controlling the operation of said stopping means, said apparatus comprising; a single phase transformer having its primary winding connected in one of said supply lines in series with said motor and one side of its secondary winding connected to said one supply line; a source of direct current; and a relay having an operating coil energized from said direct current derived from said source and a load responsive coil connected to the other side of said secondary winding and a star point for said source.

11. In an elevator installation in which an elevator car serving a plurality of landings is provided with a polyphase alternating current induction hoisting motor supplied with power from a source of polyphase alternating current, in which stopping means is provided for stopping the car at the landings and in which load determining apparatus is provided for controlling the operation of said stopping means to compensate for the load in the car in stopping the car at the landings, said apparatus comprising; a single phase transformer having its primary winding connected to be subject to the current supplied to said motor from one phase of said source; a source of direct current; a relay having an operating coil energized from said direct current source to cause operation thereof and a coil connected to be subject to the vector sum of the voltage induced in the secondary winding of said transformer and a voltage the phase of which is determined by the voltage of said one phase of said source for opposing said operating coil to cause the dropping out of said relay when the load on said motor is above a certain value.

JACOB DANIEL LEWIS.